United States Patent
Ebrahimi et al.

(10) Patent No.: US 7,681,229 B1
(45) Date of Patent: Mar. 16, 2010

(54) PROXY AUTHENTICATION

(75) Inventors: Hashem Mohammad Ebrahimi, Salt Lake City, UT (US); Mark D. Ackerman, Eagle Mountain, UT (US); Carolyn B. McClain, Springville, UT (US)

(73) Assignee: Novell, Inc., Provo, UT (US)

( * ) Notice: Subject to any disclaimer, the term of this patent is extended or adjusted under 35 U.S.C. 154(b) by 1030 days.

(21) Appl. No.: 10/873,977

(22) Filed: Jun. 22, 2004

(51) Int. Cl.
G06F 7/04 (2006.01)
G06F 15/16 (2006.01)
G06F 9/00 (2006.01)

(52) U.S. Cl. .............. 726/4; 709/229; 726/2; 726/11

(58) Field of Classification Search ........... 726/2–4, 726/11–12; 709/229
See application file for complete search history.

(56) References Cited

U.S. PATENT DOCUMENTS

| | | | |
|---|---|---|---|
| 5,875,296 A | 2/1999 | Shi et al. ............ 395/188.01 |
| 5,991,810 A | 11/1999 | Shapiro et al. ............ 709/229 |
| 6,003,084 A * | 12/1999 | Green et al. ............ 709/227 |
| 6,205,480 B1 | 3/2001 | Broadhurst et al. ......... 709/225 |
| 6,298,383 B1 | 10/2001 | Gutman et al. ............ 709/229 |
| 6,463,032 B1 * | 10/2002 | Lau et al. .................... 370/218 |
| 6,662,228 B1 | 12/2003 | Limsico .................... 709/225 |
| 7,146,505 B1 * | 12/2006 | Harada et al. ............... 713/185 |
| 2003/0065711 A1 * | 4/2003 | Acharya et al. ............ 709/203 |
| 2004/0107360 A1 * | 6/2004 | Herrmann et al. ........... 713/201 |
| 2004/0172559 A1 * | 9/2004 | Luo et al. ................... 713/201 |

\* cited by examiner

*Primary Examiner*—Kimyen Vu
*Assistant Examiner*—Suman Debnath
(74) *Attorney, Agent, or Firm*—Schwegman, Lundberg & Woessner, P.A.

(57) ABSTRACT

Techniques are provided for proxy authentication. A proxy includes a first port, a second port, and a secure port; each port processing a different service. Requests received on the first and second ports which require authentication are redirected to the secure port. The secure port processes an authentication router service. The authentication router service forwards requests for authentication to selective authentication services. The authentication services authenticate the requests over the secure port.

20 Claims, 3 Drawing Sheets

PROXY AUTHENTICATION

FIELD OF THE INVENTION

This invention relates generally to authentication and more specifically to authentication techniques for proxy servers.

BACKGROUND OF THE INVENTION

Proxy services act as intermediaries between clients and their networks. Proxy services may perform a variety of security and acceleration services on behalf of their clients. Example proxy services include forward proxies, transparent proxies, reverse proxies, secure proxies, domain-based proxies, host-based proxies, multi-homing proxies, etc. A single proxy server device can include a variety of different proxy services (e.g., forward, transparent, reverse, secure, etc.). For example, a single proxy server can present itself to one client as a forward proxy service while at the same time present itself to a different client as a transparent proxy service. Each particular proxy service is usually identified by and processed on a specific port of the proxy server device (e.g., 8080, 443, etc.).

Authentication services can also be enabled for each type of proxy service. An authentication service authorizes a client/user for access to a particular proxy service or other service. Conventionally, when authentication is enabled for any of the proxy services executing on a particular proxy server device, a unique Internet Protocol (IP) address or port combination is needed in order to handle authentication for each unique proxy service and authentication service combination. Moreover, in order to protect a client/user's identity, authentication services are typically performed using a secure communication channel.

For example, consider a forward proxy service having an IP address of "1.1.1.1" and executing on port 8080 of a proxy server device; this forward proxy service handles forward proxy requests received from clients. If authentication is enabled for port 8080, then port 443 on IP address "1.1.1.1" may be used as a secure channel on the proxy service device for authenticating the forward proxy requests. However, if another proxy service, such as a reverse proxy service, is configured on the same proxy server device where authentication is also required for that reverse proxy service, then a new IP address/port combination is needed to handle authentication for the reverse proxy service. The authentication mechanisms or services used for the forward proxy service and the reverse proxy service may be the same or different; however, each combination needs a unique IP address/port combination.

Using different IP address/port combinations can very quickly become problematic for a proxy server device having only a limited number of ports available and perhaps only one or a few secure ports available. Assigning a unique IP address/port combination is not a desired technique, because a given proxy server has only a finite number of ports. Thus, as the variety of services requiring authentication grows the proxy server may not be capable of supporting the growth. Additionally, maintenance and support can become more complex and time consuming.

Therefore, there is a need for improved proxy authentication, such that unique IP address/port combinations are not necessary when new authentication services and proxy services are added to a proxy server device.

SUMMARY OF THE INVENTION

In various embodiments of the invention, techniques are presented for proxy authentication. A single secure port for a proxy server device (hereinafter "proxy") includes an authentication router service. Proxy services, which require authentication, redirect requests to the secure port which is processing the authentication router service. The authentication router service inspects the requests and routes them to selective authentication services for authentication. In this way, a single secure port of a proxy can support a variety of proxy services, where each proxy service may use the same or different authentication services.

More specifically, and in one embodiment, a method for proxy authentication is provided. A first authentication request is received on a first port of a proxy. The first authentication request is forwarded to a first authentication service for processing. Additionally, a second authentication request is received on the same first port of the proxy. The second authentication request is forwarded to a second authentication service for processing.

DETAILED DESCRIPTION OF THE INVENTION

In various embodiments of the invention, the term "proxy" is used. A proxy is a server or processing device that includes a variety of ports and is configured to offer one or more proxy services. The proxy services act as intermediaries between clients and their networks. Some example proxy services include forward proxies, transparent proxies, reverse proxies, domain-based acceleration, host-based acceleration, multi-homing acceleration, path-based multi-homing acceleration, secure acceleration, etc. One or more of the proxy services process on one or more ports of the proxy and provide acceleration (e.g., caching, etc.) and security (authentication) to the clients vis-á-vis their networks.

Each proxy service can be enabled with an authentication service that authenticates requests to a particular proxy service or another service being managed by the particular proxy service. Authentication services can include password techniques, certificate or key techniques, biometric techniques, identity validation techniques, etc. Two different proxy services can be enabled to use the same authentication service or can be enabled to use different authentication services.

A client can be a processing device that is separate and distinct from the proxy. Alternatively, a client may be an application, service, or a user interacting with an application or service. In one embodiment, a client is a World-Wide Web (WWW) browser that a user interacts with in a local network to gain access to the Internet (external network); and the proxy sits in between the client and the Internet.

In one embodiment, the techniques presented herein are incorporated into the Secure Gateway or the Excelerator products distributed by Novell, Inc. of Provo, Utah. In another embodiment, the techniques presented herein are implemented as extensions to existing proxy services. Of course the invention is not limited to the above provided examples, since the techniques presented herein can be implemented in any standalone or modified product designed to perform proxy authentication in the manners presented herein and below.

Figure 1:
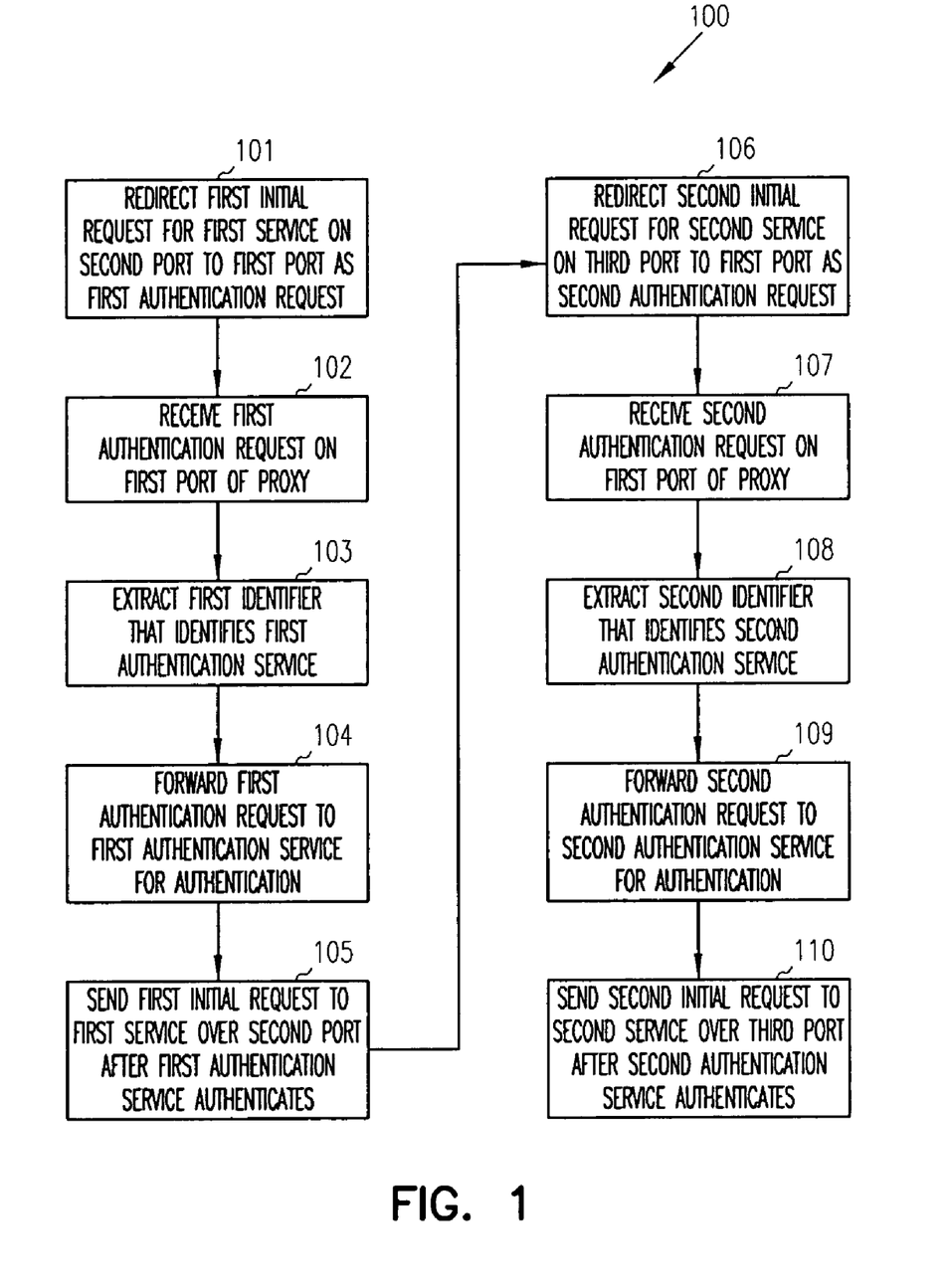
FIG. 1 is a flowchart representing a method for proxy authentication according to an example embodiment of the invention.

FIG. 1 is a flowchart representing one method 100 for proxy authentication. The method 100 is implemented as one or more applications or a service which reside in a machine-accessible medium and is accessible over a network. In one embodiment, the method 100 is implemented as an authentication router service on a proxy server device (proxy) and is processed on a secure port of that proxy. The authentication router service receives authentication requests from proxy services processing on the proxy over the secure port, and routes those requests to the appropriate authentication services, which can handle authentication for the requests.

Initially, a client issues a request for access to some desired service over a network. In one embodiment, the request is made via a WWW browser as a Uniform Resource Link (URL) or as a Uniform Resource Identifier (URI) which identifies the desired service. The desired service may require authentication before the request can be honored. Alternatively, a proxy service that processes on the proxy and acts as an intermediary between the client and the desired service intercepts or otherwise receives the request, and that proxy service requires client authentication before requests can be processed on behalf of a client to the desired service.

A proxy service acting as an intermediary between a client and a desired service over a network receives an initial non authenticated request from the client. The initial request is generated by the client and directed to a desired service. The proxy service can be a forward proxy, a transparent proxy, a reverse proxy, etc. Thus, the initial request can be received from the client at the proxy service directly (e.g., forward proxy service) or indirectly (e.g., transparent proxy service). Moreover, the proxy service processes on a specific port of a proxy. The proxy service detects that the initial request is not authenticated to the either the proxy service or to the desired service, which is the target of the initial request.

In response to the non authenticated initial request, the proxy service, at 101, redirects the initial request for a first desired service to a first and different port of the proxy. That redirected non authenticated initial request is identified by the processing, at 101, as a first authentication request. This first authentication request is received, at 102, on the first port of the proxy, after being redirected from a first service (e.g., first proxy service), where that first service processes on a second port of the proxy.

Before the first authentication request is received, at 102, the first service augments the initial client request with some information. This information appears as parameters on the first authentication request and can be used to identify a specific authentication service that can authenticate the first authentication request and may also include a profile or other meta data that the authentication service can use when performing authentication against the first authentication request.

Accordingly, at 103, the processing extracts a first identifier from parameters associated with the first authentication request. That first identifier directs the processing to a specific authentication service that will perform authentication on the first authentication request. At 104, the processing in response to the first identifier forwards or routes the first authentication request to a first authentication service, which is identified by the first identifier.

The first authentication service is then free to directly interact with the client in order to acquire client identifying information for purposes of authenticating the client and the client's initial request. Interaction can occur over the same first port of the proxy that is executing the method 100. In one embodiment, this first port is a secure port and is used as a secure channel between the client and the first authentication service. In some embodiments, the first authentication service uses profile information provided with the initial client request as parameter data, where the first proxy service provides the profile information or a reference to a file or directory that includes the needed profile information. Thus, the first authentication service need not directly interact with the client for purposes of acquiring identifying information; rather, the first proxy service that redirected the first authentication request can acquire and provide the identifying information for authentication to the first authentication service as parameter data with the redirected first authentication request.

At 105, if the first authentication service is able to authenticate the first authentication request or the client, then, the initial request directed to the first service is sent back to the second port of the proxy for processing. At this point, the initial request is authenticated for access to the first service. One technique for proving authentication is via a cookie installed in the local environment of the client that includes credential information or other key information which the first service can acquire to satisfy itself that the initial request is authenticated for access to the first service. In some cases, the credential information may be assertions represented in Extensible Markup Language (XML) or Security Assertion Markup Language (SAML).

At 106, a second initial request received from either a second client or received from the same first client but directed toward a different second service. This second initial request can be received concurrent with the receipt of the first initial request, can be received prior to the first initial request, or can be received after the first initial request is received. The second initial request is redirected from a third port of the proxy by a second proxy service and is received by the processing at 107.

Again, the second proxy service adds parameter information to the second initial request. That parameter information includes the identity of a second authentication service used to authenticate the second initial request and may optionally include other profile or identifying information collected about the client associated with the second initial request, which may be consumed or used by the second authentication service to authenticate the second initial request. The processing receives the parameterized second initial request as a second authentication request.

At 108, a second identifier is extracted from the second authentication request and used to forward the second authentication request along to a second authentication service for authentication at 109. Again, any profile or identifying information that may be needed by the second authentication service may be provide as parameters in the second authentication request or may be interactively acquired by the second authentication service from the sending client or dynamically acquired from the local environment of the sending client. In one embodiment, once the second authentication service authenticates the second authentication request and/or its associated client, that authentication can be embodied as credential information in the local environment of the client and expressed as assertions, keys, or other identifying information.

At 110, if the second authentication service authenticates the second authentication request, then the second initial request is forward back to the third port for processing to the second service as an authenticated request. The second service may rely on assertions or other credential information that may be relayed along with the second initial request or may be acquired by the second service from local environment of the client associated with the second initial request.

As was previously discussed the second port and third port can process a variety of proxy services (e.g., acceleration and/or security). In one embodiment, the second port processes a transparent proxy service and the third port processes a forward or reverse proxy service. In some cases, both the transparent and forward or reverse proxy services use the same LDAP authentication service, which is contacted by the processing of the method 100 over a first port on behalf of both the transparent and forward or reverse proxy services. In other cases, the transparent and forward or reverse proxy services use different authentication services; however, both different authentication services are handled by the processing of the method 100 over the first port on behalf of the transparent and forward or reverse proxy services.

The techniques presented with the method 100 of FIG. 1 illustrate how a single port of a proxy can be used as an authentication router service for a plurality of authentication services and proxy services that may process on the proxy. Conventionally, each unique combination of proxy services and authentication services required unique IP address/port combinations. However, with the teachings presented herein a single secure port of a proxy can be used as a routing service that locates and contacts an appropriate authentication service to authenticate a request. An appropriate authentication service can be resolved based on parameters provided by a proxy service that redirects initial requests to the authentication router service.

Figure 2:
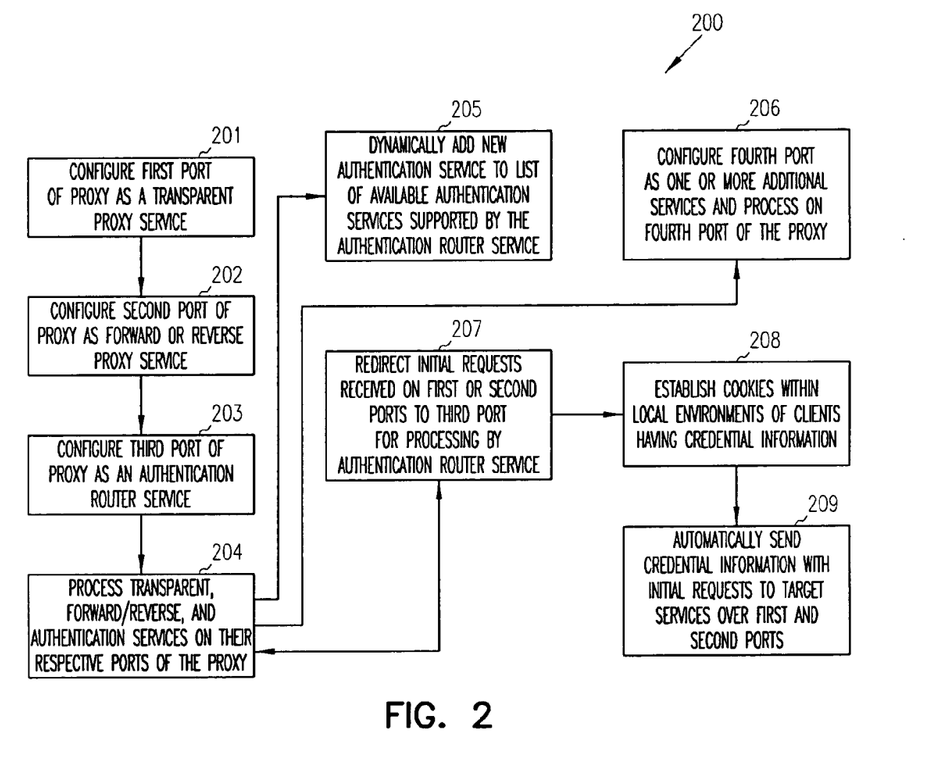
FIG. 2 is a flowchart representing another method for proxy authentication, according to an example embodiment of the invention.

FIG. 2 is a flowchart of another method 200 for proxy authentication. The method 200 is implemented in a machine-accessible or readable medium and is accessible over a network. The method 200 represents processing for configuring and processing a variety of services on a proxy server device (proxy); such that a single port of the proxy is used for satisfying authentication needs associated with a plurality of proxy services and authentication services which may also be processed on the proxy.

At 201, a first port of a proxy is configured as a first proxy service, such as a transparent proxy service. That is, the first port handles transparent proxy requests for certain clients of a network and these clients are not aware of the transparent proxy service, but requests from the clients are directed to the transparent proxy service for processing.

In a like manner, at 202, a second port of the proxy is configured as a second proxy service, such as a forward or reverse proxy service. The second port handles forward or reverse proxy requests for clients. That is, in cases where the second port handles forward proxy requests, certain clients are configured to contact a forward proxy service for certain network requests (e.g., Internet traffic). These clients are configured by providing the IP address or second port identifier as the address or port that is to process network requests for the clients. For example, in instances where the clients are WWW browsers, the browsers are configured such that connections to the Internet occur over the second port identifier which processes the forward proxy service.

At 203, a third port of the proxy is configured as an authentication router service, such as the authentication router service presented above as method 100 of FIG. 1. The first and second ports and their respective proxy services are enabled for authentication and designed to forward or redirect clients to contact the third port in instances where authentication is needed for requests or clients. The authentication router service forwards requests to appropriate authentication services for authentication based on parameter information included with the requests. This parameter information is placed on requests by the first and second proxy services based on the type of request and the requestor (client) making the request.

For example, the transparent proxy service may authenticate all clients (requestors) to the transparent proxy on first use, by using an identification and password verification via a LDAP service. The password may be permissibly available in a cookie for a client. In this example, the transparent proxy receives an initial request from a requestor (the client), acquires the cookie having the password and identification for the client, acquires an identifier for the LDAP service, and attaches this as parameter information to the initial request and redirects the client to the third port having the authentication router service.

The authentication router service extracts the parameter information to identify the LDAP service and forwards the client identifier and cookie to the LDAP service for authentication. Alternatively, the LDAP service can establish an interactive session with the client via the third port for purposes of authenticating the client. Once the client is authenticated, an assertion or credential information can be associated with the initial request of the client or installed as another cookie within the local environment of the client. The initial client request can now be forwarded back to the initial requested service for processing and that requested service can satisfy itself as to the client's identity and authorization via the credential information included as parameter data with the initial request or included as a cookie within the local environment of the client.

Once the first, second, and third port are configured to accept processing for transparent process requests, forward or reverse process requests, and authentication requests, respectively, the services are processed on the proxy or interfaced directly to the appropriate ports of the proxy. At 205, the authentication router service can support a variety of authentication services; some of these services can be dynamically added as new authentication services which the authentication router service can support. By support it is meant that the authentication router service can identify an authentication service and route authentication requests along with appropriate parameter information to that authentication service in a manner that the authentication service can recognize and process.

In one embodiment, at 206, a fourth port of the proxy is configured to process one or more additional services. These additional services are processed on or interfaced to the fourth port of the proxy. Additionally, these additional services may also redirect and parameterize requests that need authentication to the authentication router service processing on the third port. In fact, if desired, all authentication requests may be handled and processed by the authentication router service for the proxy over the third port. In some embodiments, the third port is also a secure port, such as port 443 for WWW browser traffic.

During operation of the method 200, initial requests requiring authentication are received over the first and second ports of the proxy, the transparent and forward or reverse proxies redirect and parameterize these requests to the authentication router service accessible via port three, at 207. The authentication router service inspects the parameter information to determine which authentication services are needed to authenticate the requests and forwards the requests to the appropriate authentication services along with any profile information, which may be consumed or used by the authentication services.

The authentication services authenticate the requests or do not authenticate the requests. In some embodiments, an authentication service may use the third port of the authentication router as a secure channel with a client associated with a request. The client and authentication service interact with one another for purposes of verifying to the authentication service that the client is legitimate or authorized to issue the request. In other embodiments, profile, cookie, or other credential information may be automatically provided to or acquired by the authentication services and used to authenticate clients and their requests.

In an embodiment, at 208, the authentication services may establish cookies within the local environments of the clients, where those cookies include credential information that other services can rely upon to ensure that requests and/or clients associated with requests are properly authenticated. In other words, once a client is authenticated a cookie having an assertion or other valid credential information can be housed in a cookie which other services can automatically acquire to ensure that the clients are authenticated for access. In some embodiments, at 209, the credential information may be automatically attached as parameter information to initial client issued requests and forwarded to the initial desired services in order to prove or establish authentication for a client or request.

As an example of how a particular transaction for a forward proxy located on the second port of the proxy may process a transaction, consider the following. A user processes a WWW browser on a client, that WWW browser or client is configured to issue Internet requests to the second port of the proxy where the forward proxy service is processing. The user issues a first and initial request as "GET http://www.foo.com," which is a request for a foo service, and since the client is configured to issue Internet traffic to the second port, this is received by the forward proxy on behalf of the client.

The forward proxy detects the identity or purported identity of the user or client that sent the initial request ("GET http://www.foo.com") and determines (e.g., based on a lookup table or other logic or data structure) that a LDAP authentication service is needed and that this particular client has a profile that can be used for authentication by the LDAP service. This information along with the initial request is redirected back to the client as "Redirect to https://1.1.1.1.: 443/xlrlogin/?"http:://www.foo.com" -p ldap -s fp1." This forces the client browser to use address and port combination "1.1.1.1.:443," which is a third port of the proxy, a secure port, and which is processing the authentication router service. The string " " -p ldap -s fp1" is the parameterized information inserted by the forward proxy service which instructs the authentication router service that the authentication service is identified by the parameter "fp1", where "-s" indicates the needed authentication service string follows. The "-p ldap" identifies the LDAP profile to use for the requesting client.

The authentication router service issues a "GET authentication information or VERIFY client/user identity" request to the authentication service identified as "fp1." The authentication service returns a verification using the profile "ldap" or perhaps as a result of interacting with the user/client over the secure channel. Once authenticated, a "set cookie" is issued to the client's browser; this cookie validates the user or client to the foo service. The browser is then redirected back to the original request "GET http://www.foo.com." The foo service acquires the cookie and grants access to the client.

In some embodiments, two separate requests from the same client may be associated with the same profile. In these situations, the authentication router service can detect that the client is already authenticated or signed into to one service and thus automatically permit the client to be authenticated to a second service associated with the same profile. This can occur by providing the profile, already acquired with the first request to the second request for immediate validation to a second desired service. Thus, in some embodiments, the present invention permits single-sign on when the profile information is the same for two different services.

The above-presented example was presented for purposes of illustration only. Varieties of scenarios are possible and intended to fall within the generous scope of embodiments of this invention. The method 200 teaches how a proxy can be configured and processed, such that authentication is handled over a secure port by a single authentication router service that manages interactions for a plurality of authentication services. Interactions can be achieved without modification to clients and authentication services or proxy services are easily dynamically added to and removed from the proxy.

Figure 3:
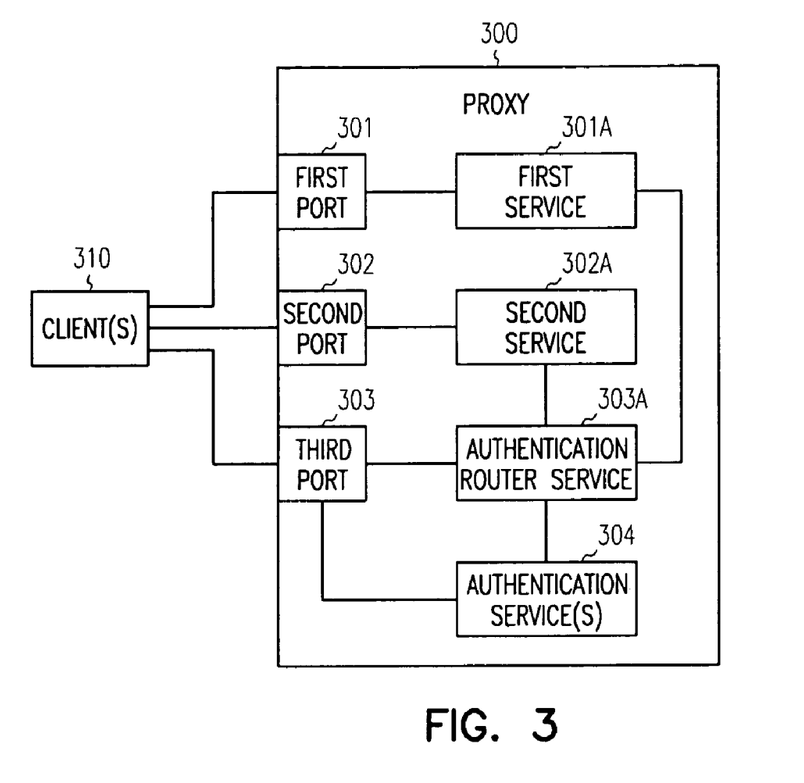
FIG. 3 is a diagram of a proxy authentication system, according to an example embodiment of the invention.

FIG. 3 is a diagram that illustrates a proxy authentication system 300. The proxy authentication system 300 is implemented in a machine-accessible or readable medium and acts as an intermediary between clients and external networks of the clients. In one embodiment, the proxy authentication system 300 is a proxy server device (proxy) having a plurality of ports and services processing thereon.

The proxy authentication system 300 includes a first port 301, a second port 302, and a third port 303. The first port 301 processes or is interfaced to a first service 301A. The second port processes or is interfaced to a second service 302A. The first and second services 301A and 302A are proxy services (e.g., forward, transparent, reverse, etc.). Each port 301 and 302 may process or be interfaced to other services, but minimally, each port includes at least one proxy service 301A or 302A.

The third port 303 processes or is interfaced to an authentication router service 303A. In one embodiment, the third port 303 is a secure port capable of establishing secure channels with clients 310 of a network. The authentication router service 303A is interfaced to one or more authentication services 304. Additionally, the first service 301A and the second service 302A are aware of and know the address and port associated with the authentication router service 303A. This permits the first and second services 301A and 302A to directly access the authentication router service 303A or to instruct the clients 310 to contact the authentication router service 303A, such as via a WWW browser redirect command.

In one embodiment, the first service 301A is a transparent proxy service and the second service 302A is a forward or reverse proxy service. In another embodiment, the first, second, and authentication router services 301A, 302A, and 303A, respectively, interact with clients 310 via WWW browser transactions.

During operation of the proxy authentication system 300, transactions are processed in manners similar to what was presented above with respect to methods 100 and 200 of FIGS. 1 and 2, respectively. That is, a client 310 issues an initial request for a desired service, this request is either received on the first port 301 and handled by the first service 301A or received on the second port 302 and handled by the second service 302A. The handling service 301A or 302A identifies the desired service and any profile information associated with the requesting client 301; this information is parameterized and sent directly to the authentication router service 303A or back to the client 310 along with a redirection request to access port 303, where the authentication router service 303A is processing.

When the authentication router service 303A receives the parameterized initial request, it examines the parameters and contacts the proper authentication service 304 for purposes of acquiring client 310 authentication. In some embodiments, the authentication service 304 may manually interact with the client 310 for purposes of acquiring credential information needed to authenticate the client 310. This interaction can be achieved via the third port 303 as a secure channel with the client 310, such that the credential information is not exposed over the network unnecessarily. In still another embodiment, the authentication service 304 may automatically acquire credential information from local environments of the client 310, and may automatically install credential information for the client 310 within its local environment.

Once a client 310 is properly authenticated, the client 310 is redirected back to the initial desired service along with the credential information or a reference to the credential information which the desired service can use to acquire the credential information.

The proxy authentication system 300 permits a single secure port 303 to be used for all authentication of a proxy, if desired, via an authentication router service 303A that processes on or is interfaced to that secure port 303. Individual authentication services 304 are interfaced to the authentication router service 303A and added and removed as needed. Conventionally, each proxy service and authentication service needed a unique IP address/port combination within a single proxy. This unduly limited the available authentication services and maintenance of proxies. The proxy authentication system 300 now eliminates these prior limits since disparate authentication techniques can be handled by a single authentication router service 303A processing on a single secure port 303.

Figure 4:
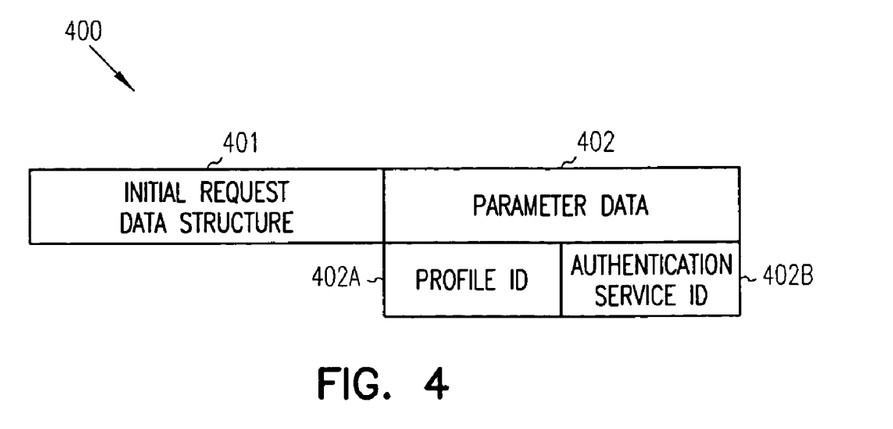
FIG. 4 is a diagram representing a proxy authentication data structure implemented in a machine-accessible medium, according to an example embodiment of the invention.

FIG. 4 is a diagram of a proxy-authentication data structure 400. The proxy-authentication data structure 400 is implemented in a machine-accessible or readable medium and is used for proxy authentication of a client or a request of a client. In one embodiment, the proxy-authentication data structure 400 is produced from a proxy service (e.g., forward, transparent, forward, etc.) in the manners described above with respect to methods 100, 200, and system 300 of FIGS. 1-3, respectively. That is, proxy-authentication data structure 400 represents a parameterized initial request submitted by a client that requires authentication by an authentication service. The proxy-authentication data structure 400 is consumed by an authentication router service, such as the authentication router service 303A described in the proxy authentication system 300 of FIG. 3, and the processing of the method 100 described in FIG. 1.

The proxy-authentication data structure 400 includes an initial request data structure 401 and parameter data 402. The initial request data structure 401 is created or generated from a requesting client and is directed to an initial desired service that the client wants to interact with. The proxy service that operates on a designated IP address/port of a proxy receives this initial request data structure 401 and uses it in combination with the identification of the requesting client to generate the parameter data 402.

The parameter data 402 can optionally include a profile identifier 402A for a requesting client and includes an authentication service identifier 402B. The authentication service identifier 402B is extracted by an authentication router service that processes on a secure designated port of the proxy (e.g., 443). The authentication service identifier 402B permits the authentication router service to identify a specific authentication service that can authenticate the requesting client or can authenticate the initial request data structure 401 for submittal to the initial desired service of the requesting client. In some embodiments, the profile identifier 402A permits the authentication router service to acquire credential information or authentication techniques on behalf of the requesting client and to directly interact with the authentication service on behalf of the requesting client for purposes of authenticating the requesting client.

The authentication service identified by the authentication service identifier 402B may directly interact with the client or may interact with the authentication router service. Interactions occur over the secure port that the authentication router service is interface to or processing on. In an embodiment, the authentication service can also set a cookie with credential information or authentication assertions that the initial desired service can acquire in order to satisfy the desired service that the requesting client is authorized to submit the initial request data structure 401.

Multiple instances of the proxy-authentication data structure 400 can be processed by a single authentication router service for purposes of interacting with a variety of disparate authentication services and proxy services for a variety of requesting clients. Furthermore, each of the proxy services may be associated with a different port of the proxy.

The proxy-authentication data structure 400 is generated or created by proxy services and consumed by a single instance of an authentication router service. This permits multiple authentication services to be processed over a single secure port of a proxy based on instances of the proxy-authentication data structure 400 which are handled by the authentication router service.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided in order to comply with 37 C.F.R. §1.72(b), which requires an Abstract allow a reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for proxy authentication implemented and executed on a proxy device for performing the method, comprising:
   receiving, at the proxy device, a first authentication request on a first port of a proxy;
   forwarding, by the proxy device, the first authentication request to a first authentication service for processing;
   receiving, by the proxy device, a second authentication request on the first port of the proxy; and
   forwarding, by the proxy device, the second authentication request to a second authentication service for processing, wherein the first and second authentication services are different from one another and the first and second authentication requests are received over the first port of the proxy and the first authentication service is a Lightweight Directory Access Protocol (LDAP) authentication service, and wherein disparate authentication techniques are routed to the first and second authentication services when the corresponding authentication requests are both received over and processed from a single port of the proxy, which is the first port of the proxy, and wherein interactions with the first and the second authentication services occur over the single port of the proxy.

2. The method of claim 1 further comprising:
   extracting, by the proxy device, a first identifier that identifies the first authentication service from the first authentication request; and
   extracting, by the proxy device, a second identifier that identifies the second authentication service from the second authentication request.

3. The method of claim 1 further comprising:
   redirecting, by the proxy device, an initial first request for a first service directed to a second port to the first port as the first authentication request; and
   redirecting, by the proxy device, an initial second request for a second service directed to a third port to the first port as the second authentication request.

4. The method of claim 3 further comprising:
   sending, by the proxy device, the initial first request to the first service over the second port after the first authentication service authenticates the first authentication request over the first port; and
   sending, by the proxy device, the initial second request to the second service over the third port after the second authentication service authenticates the second authentication request over the first port.

5. The method of claim 4 further comprising, processing, by the proxy device, the method as transactions within a World-Wide Web (WWW) browser over the Internet.

6. The method of claim 4 further comprising:
   processing, by the proxy device, a transparent proxy on the second port; and
   processing, by the proxy device, a forward or a reverse proxy on the third port.

7. The method of claim 1 further comprising, processing, by the proxy device, the method as an authentication router service over the first port, wherein the first port is a secure port.

8. A method for proxy authentication implemented and executed on a proxy device for performing the method, comprising:
   configuring, by the proxy device, a first port of a proxy as a transparent proxy service;
   configuring, by the proxy device, a second port of the proxy as a forward proxy service;
   configuring, by the proxy device, a third port of the proxy as an authentication router service, wherein the authentication router service routes authentication requests received from the first and the second ports to selective authentication services in accordance with parameter information placed on the requests by the transparent and forward proxy services in response to types associated with the requests and requesters making the requests, and wherein interactions with the selective authentication services occur over the third port, and wherein a client associated with the authentication requests is unaware of the transparent proxy service but is aware of and configured to directly interact with the forward proxy service, wherein the client is configured to direct its traffic a second port identifier that identifies the second port that is the forward proxy service, and wherein some of the authentication services are different from one another and at least one of the authentication services is a Lightweight Directory_ Access Protocol (LDAP) authentication service; and
   processing, by the proxy device, the transparent proxy service, the forward proxy service, and the authentication router service on their respective ports of the proxy, and wherein when at least one authentication for at least one authentication service occurs an assertion is embodied in a particular local environment of a particular client to indicate successful authentication.

9. The method of claim 8 further comprising, dynamically adding the proxy device, a new authentication service to a list of available authentication services that the authentication router service supports.

10. The method of claim 8 further comprising:
    configuring, by the proxy device, a fourth port of the proxy as one or more additional services; and
    processing, by the proxy device, the one or more additional services on the fourth port of the proxy.

11. The method of claim 8 further comprising, redirecting, by the proxy device, initial requests, received on the first and second port, to the third port for routing by the authentication router service to the selective authentication services.

12. The method of claim 11 further comprising, performing, by the proxy device, the redirection of the initial requests as transactions from within World-Wide Web (WWW) browsers over the Internet.

13. The method of claim 12 further comprising, establishing by the proxy device, one or more cookies having credential information within environments of clients processing the WWW browsers, wherein the credential information authenticates the initial requests to target services over the first and second ports.

14. The method of claim 12 further comprising, automatically sending, by the proxy device, the credential information along with the initial requests to the target services over the first and second ports.

15. A proxy authentication system, comprising:
    a first port having a first proxy service;
    a second port having a second proxy service; and
    a third port having an authentication router service, wherein initial requests received on the first and second port which require authentication are redirected to the authentication router service on the third port, the authentication router service routes the initial requests to authentication services which authenticate the initial requests for access to target services in accordance with parameter information placed on the requests by the first and second proxy services in response to types associated with the requests and requesters making the requests, and wherein interactions with the authentication services occur over the third port, and wherein some of the authentication services are different from one another and at least one of the authentication services is a Lightweight Directory Access Protocol (LDAP) authentication service, and wherein the second proxy service is a forward proxy service that a client is directly configured to interact with and is aware of and the client is configured to direct its traffic a second port identifier that identifies the second port that is the second proxy service, and wherein the first proxy service is a transparent proxy service the client is unaware of and indirectly interacts with.

16. The proxy authentication system of claim 15, wherein the first proxy, second proxy, and authentication router services interact with clients via World-Wide Web (WWW) browser transactions.

17. The proxy authentication system of claim 15, wherein the client and other clients associated with the initial requests are manually prompted for credential information by the authentication services.

18. The proxy authentication system of claim 15, wherein credential information is automatically acquired from environments of the client and other clients which issue the initial requests.

19. The proxy authentication system of claim 15, wherein the authentication services automatically install credential information within local environments of the client and other clients which issue the initial requests after the client and the other clients are authenticated by the authentication services.

20. The proxy authentication system of claim 15, wherein authentication router services determines that credential information associated with a first initial request and a first desired service is the same as credential information associated with a second initial request for a second desired service, and wherein the authentication router automatically supplies the credential information to the second desired service for verification.

* * * * *

UNITED STATES PATENT AND TRADEMARK OFFICE
CERTIFICATE OF CORRECTION

PATENT NO.         : 7,681,229 B1                      Page 1 of 1
APPLICATION NO.    : 10/873977
DATED              : March 16, 2010
INVENTOR(S)        : Hashem M. Ebrahimi et al.

It is certified that error appears in the above-identified patent and that said Letters Patent is hereby corrected as shown below:

In column 12, line 21, in Claim 8, delete "Lightweight Directory_ Access Protocol" and insert -- Lightweight Directory Access Protocol --, therefor.

In column 12, line 31, in Claim 9, delete "adding the" and insert -- adding, by the --, therefor.

In column 12, line 48, in Claim 13, after "establishing" insert -- , --.

Signed and Sealed this

Eighth Day of June, 2010

David J. Kappos
*Director of the United States Patent and Trademark Office*